(12) United States Patent
Buhrman et al.

(10) Patent No.: US 10,662,652 B2
(45) Date of Patent: May 26, 2020

(54) HEATING COMPENSATING ROOFING BOARDS

(71) Applicant: Carlisle Intangible Company, Charlotte, NC (US)

(72) Inventors: Chad Buhrman, Mechanicsburg, PA (US); Ronald L. Goodman, Charlotte, NC (US)

(73) Assignee: Carlisle Intangible Company, Syracuse, NY (US)

( * ) Notice: Subject to any disclaimer, the term of this patent is extended or adjusted under 35 U.S.C. 154(b) by 0 days.

(21) Appl. No.: 15/455,927

(22) Filed: Mar. 10, 2017

(65) Prior Publication Data

US 2017/0260748 A1    Sep. 14, 2017

Related U.S. Application Data

(60) Provisional application No. 62/306,273, filed on Mar. 10, 2016.

(51) Int. Cl.
*E04D 11/02*    (2006.01)
*E04D 3/35*    (2006.01)
(Continued)

(52) U.S. Cl.
CPC ............... *E04D 11/02* (2013.01); *B32B 3/06* (2013.01); *B32B 5/022* (2013.01); *B32B 5/18* (2013.01);
(Continued)

(58) Field of Classification Search
CPC .. B32B 5/18; B32B 7/12; B32B 25/16; B32B 27/065; B32B 27/304; B32B 27/32; B32B 2266/0228; B32B 2266/0257; B32B 2307/304; B32B 2307/402; B32B 2307/416; B32B 2419/06; B32B 3/06;
(Continued)

(56) References Cited

U.S. PATENT DOCUMENTS 3,971,184 A * 7/1976 Van Wagoner ......... E04D 3/352
428/201
4,357,377 A * 11/1982 Yamamoto .............. B32B 11/02
428/40.3
(Continued)

FOREIGN PATENT DOCUMENTS

FR    2951992 A1    5/2011

OTHER PUBLICATIONS

International Searching Authority, Search Report and Written Opinion issued in International Application No. PCT/US2017/021876 dated Jun. 14, 2017 (13 pages).
(Continued)

*Primary Examiner* — James M Ference
(74) *Attorney, Agent, or Firm* — Wood Herron & Evans LLP

(57) ABSTRACT

A roofing board, such as a polyiso insulation board, includes first and second surfaces, where the first surface is lighter in color than the second surface. This allows the roofing installer to choose which of the surfaces to expose to the atmosphere, the lighter surface being cooler than the darker surface. The lighter surface may have a solar reflectance greater than the darker surface. A roofing membrane is then adhered or otherwise attached to the exposed surface.

20 Claims, 1 Drawing Sheet

(51) Int. Cl.

| | | |
|---|---|---|
| *B32B 21/02* | (2006.01) | |
| *B32B 3/06* | (2006.01) | |
| *B32B 13/14* | (2006.01) | |
| *B32B 21/04* | (2006.01) | |
| *B32B 25/10* | (2006.01) | |
| *B32B 5/24* | (2006.01) | |
| *B32B 13/04* | (2006.01) | |
| *B32B 27/06* | (2006.01) | |
| *B32B 5/02* | (2006.01) | |
| *B32B 27/12* | (2006.01) | |
| *B32B 17/02* | (2006.01) | |
| *B32B 21/10* | (2006.01) | |
| *B32B 25/04* | (2006.01) | |
| *B32B 7/04* | (2019.01) | |
| *B32B 5/18* | (2006.01) | |
| *B32B 7/12* | (2006.01) | |
| *B32B 25/16* | (2006.01) | |
| *B32B 27/30* | (2006.01) | |
| *B32B 27/32* | (2006.01) | |
| *E04D 5/10* | (2006.01) | |

(52) U.S. Cl.
 CPC ............... *B32B 5/245* (2013.01); *B32B 7/04* (2013.01); *B32B 7/12* (2013.01); *B32B 13/04* (2013.01); *B32B 13/14* (2013.01); *B32B 17/02* (2013.01); *B32B 21/02* (2013.01); *B32B 21/04* (2013.01); *B32B 21/10* (2013.01); *B32B 25/04* (2013.01); *B32B 25/10* (2013.01); *B32B 25/16* (2013.01); *B32B 27/06* (2013.01); *B32B 27/065* (2013.01); *B32B 27/12* (2013.01); *B32B 27/304* (2013.01); *B32B 27/32* (2013.01); *E04D 3/35* (2013.01); *E04D 3/351* (2013.01); *E04D 3/352* (2013.01); *E04D 3/354* (2013.01); *E04D 5/10* (2013.01); *B32B 2250/04* (2013.01); *B32B 2255/00* (2013.01); *B32B 2262/101* (2013.01); *B32B 2266/0214* (2013.01); *B32B 2266/0228* (2013.01); *B32B 2266/0257* (2013.01); *B32B 2307/304* (2013.01); *B32B 2307/402* (2013.01); *B32B 2307/4026* (2013.01); *B32B 2307/416* (2013.01); *B32B 2419/06* (2013.01); *Y02A 30/255* (2018.01); *Y02B 80/34* (2013.01)

(58) Field of Classification Search
 CPC ........... B32B 5/02; B32B 5/022; B32B 5/245; B32B 5/32; B32B 7/02; B32B 7/04; B32B 13/04; B32B 13/14; B32B 17/02; B32B 21/02; B32B 21/04; B32B 21/12; B32B 25/04; B32B 25/10; B32B 27/06; B32B 27/12; B32B 2250/04; B32B 2255/00; B32B 2262/101; B32B 2266/0214; B32B 2305/08; B32B 2305/38; E04D 5/10; E04D 11/02; E04D 3/35; E04D 3/351; E04D 3/352; E04D 3/354; E04B 1/80; Y02A 30/255; Y02B 80/34
 See application file for complete search history.

(56) References Cited

U.S. PATENT DOCUMENTS

| | | | | |
|---|---|---|---|---|
| 4,388,366 A * | 6/1983 | Rosato | ...................... | B32B 5/18 442/374 |
| 4,774,794 A * | 10/1988 | Grieb | ...................... | E04B 7/225 52/309.12 |
| 4,847,157 A * | 7/1989 | Goodman | ......... | B32B 17/10018 428/426 |
| 4,943,484 A * | 7/1990 | Goodman | ............... | B32B 17/10 428/212 |
| 5,001,005 A * | 3/1991 | Blanpied | ............... | B29C 67/248 442/373 |
| 5,058,333 A * | 10/1991 | Schwartz | .................. | E04B 7/00 52/16 |
| 5,087,525 A * | 2/1992 | Goodman | ........... | C03C 17/3435 428/216 |
| 5,134,014 A * | 7/1992 | Zaima | ..................... | B32B 29/08 428/186 |
| 5,192,598 A * | 3/1993 | Forte | ........................ | B32B 5/18 428/71 |
| 5,217,753 A * | 6/1993 | Goodman | ........... | C03C 17/3435 427/166 |
| 5,345,738 A * | 9/1994 | Dimakis | ................... | B32B 5/18 52/309.9 |
| 5,352,649 A * | 10/1994 | Shibahashi | ............... | A61K 8/02 101/491 |
| 5,673,524 A * | 10/1997 | Gailey | ...................... | B32B 3/06 52/309.9 |
| 5,688,592 A * | 11/1997 | Shibahashi | ............. | B32B 27/18 428/323 |
| 5,735,092 A * | 4/1998 | Clayton | ..................... | B32B 5/18 52/309.9 |
| 5,750,265 A * | 5/1998 | Goodman | ........... | C03C 17/3417 359/359 |
| 6,044,604 A * | 4/2000 | Clayton | ................... | E04C 2/246 52/309.9 |
| 6,093,481 A * | 7/2000 | Lynn | ........................ | B32B 5/20 428/217 |
| 6,500,555 B1* | 12/2002 | Khaldi | ...................... | B32B 7/02 428/457 |
| 6,562,444 B1* | 5/2003 | Gleeson | .................. | B32B 13/00 428/214 |
| 6,800,352 B1* | 10/2004 | Hejna | ...................... | B27N 3/04 428/131 |
| 6,858,306 B1* | 2/2005 | Strickler | ............... | C03C 17/002 359/350 |
| 7,476,427 B2* | 1/2009 | Ruid | ........................ | B32B 17/02 428/35.7 |
| 7,524,555 B2* | 4/2009 | Peng | ........................ | B32B 7/12 428/294.7 |
| 7,658,040 B2* | 2/2010 | Bennett | .................... | B32B 21/06 52/177 |
| 7,721,506 B2* | 5/2010 | Bennett | .................... | E04D 3/351 52/177 |
| 7,749,598 B2* | 7/2010 | Agrawal | ................... | B32B 5/18 428/198 |
| 7,842,629 B2* | 11/2010 | Jaffee | ................... | B28B 19/0092 442/348 |
| 7,972,688 B2* | 7/2011 | Letts | ........................ | B32B 5/18 428/316.6 |
| 8,241,728 B2* | 8/2012 | Guerra | .................... | B32B 11/08 428/150 |
| 8,453,390 B2* | 6/2013 | Letts | ........................ | B32B 27/40 428/423.1 |
| 9,216,560 B2* | 12/2015 | Crostic, Jr. | ............. | B32B 15/14 |
| 2003/0152747 A1* | 8/2003 | Fensel | ...................... | B32B 5/16 428/143 |
| 2004/0109983 A1* | 6/2004 | Rotter | ...................... | B32B 5/18 428/143 |
| 2004/0170873 A1* | 9/2004 | Smith | ..................... | B32B 13/14 428/703 |
| 2006/0275561 A1* | 12/2006 | Agrawal | ................... | B32B 5/18 428/2 |
| 2006/0276093 A1* | 12/2006 | Agrawal | ................... | B32B 5/18 442/374 |
| 2007/0054129 A1* | 3/2007 | Kalkanoglu | .............. | B32B 5/022 428/413 |
| 2007/0130850 A1* | 6/2007 | Miekka | .................... | E04D 1/28 52/198 |
| 2008/0008857 A1* | 1/2008 | Kalkanoglu | .............. | B44F 1/10 428/143 |

(56) References Cited

U.S. PATENT DOCUMENTS

| | | | | |
|---|---|---|---|---|
| 2008/0176022 A1* | 7/2008 | Payne | D04H 11/00 | 428/91 |
| 2010/0129622 A1* | 5/2010 | Kalkanoglu | B29C 47/046 | 428/203 |
| 2011/0123712 A1* | 5/2011 | Becker, IV | C09K 9/02 | 427/162 |
| 2011/0209742 A1* | 9/2011 | Narayanamurthy | F24D 11/003 | 136/246 |
| 2011/0292488 A1* | 12/2011 | McCarthy | G02F 1/0147 | 359/265 |
| 2012/0260587 A1* | 10/2012 | Pini | H02S 40/44 | 52/173.3 |
| 2014/0030946 A1* | 1/2014 | Grove, III | D21H 13/40 | 442/60 |
| 2014/0069036 A1* | 3/2014 | Noton | E04D 1/04 | 52/173.3 |
| 2014/0130435 A1* | 5/2014 | Paradis | E04D 1/28 | 52/309.12 |
| 2014/0202643 A1* | 7/2014 | Hikmet | B32B 38/0004 | 160/5 |
| 2014/0259972 A1* | 9/2014 | Feuer | E04D 7/00 | 52/58 |
| 2014/0260074 A1* | 9/2014 | Johnson | B29C 44/22 | 52/745.06 |
| 2014/0271440 A1* | 9/2014 | Constantz | C01F 11/181 | 423/430 |
| 2015/0146286 A1* | 5/2015 | Hagen | C03C 17/3435 | 359/359 |
| 2017/0260748 A1* | 9/2017 | Buhrman | B32B 5/18 | |

OTHER PUBLICATIONS

Carlisle Syntec Systems, "DensDeck Prime Roof Board," www.carlislesyntec.com, Jan. 26, 2017 (2 pages).

Carlisle Syntec Systems, "DensDeck Roof Board," www.carlislesyntec.com, Jan. 26, 2017 (2 pages).

Carlisle Syntec Systems, "HP Recovery Board," www.carlislesyntec.com, Jun. 5, 2017 (1 page).

* cited by examiner

HEATING COMPENSATING ROOFING BOARDS

BACKGROUND OF THE INVENTION

Roofing boards can include particle boards, gypsum boards, or foam insulation boards. Some include facers. Others do not. Polyiso insulation boards include facers for manufacturing (foam laydown) and to provide many of the product's performance properties. The majority of facers fall into two categories: Glass Reinforced Felt (GRF) or Coated Glass Faced (CGF). GRF facers are also known as "paper" facers given their craft paper appearance. GRF facers generally range in color from light brown to darker brown and are made from fiberglass reinforced pulp paper. CGF facers, on the other hand, tend towards white to off-white in color and are made by coating a non-woven fiberglass scrim. Insulation facers, whether GRF or CGF, are the same color on both sides of the board.

Adhering single-ply membranes to roofing boards, such as insulation boards is common practice and is becoming a more preferred method of roof installation. Each adhesive has its own requirements in terms of "setup time". In other words, the adhesive has to flash-off, get to string time, etc. before the membrane can be adhered to the insulation. The setup time can vary dramatically based on the ambient environmental conditions (e.g., air temperature, insulation/membrane temperature, humidity, sunlight/solar energy, etc.) on the rooftop.

SUMMARY OF THE INVENTION

When the ambient environmental conditions create longer than desired adhesive setup times, a darker-colored surface or facer has the ability to absorb the sun's radiant energy and help to speed up the setup times. Transferring the sun's radiant energy to the roofing board outer surface produces several outcomes, including, but not limited to, warmer facer temperature and increased drying potential, ultimately leading to reduced adhesive setup times.

When the ambient environmental conditions create shorter than desired adhesive setup times, a lighter-colored surface or facer has the ability to reflect the sun's radiant energy and help to slow them down. Reflecting the sun's radiant energy from the surface produces several outcomes, including, but not limited to cooler facer temperatures and reduced drying potential, ultimately leading to extended adhesive setup times.

In an embodiment, the present invention provides a roofing board, such as a foam board insulation product, with surfaces on one side of the board and on the other side of the board having different light absorption characteristics. The sides of the board referenced are the two largest surface area sides of the six-sided board, generally described as the top and bottom. The varying light absorption characteristics of the surfaces would allow the end-user to choose the side of the board most appropriate for the ambient environmental conditions at any given time on the jobsite.

In an embodiment, the present invention provides a roofing board, such as a foam board insulation product, with a lighter surface on one side of the board and a darker surface on the other side of the board. For purposes of describing the surface color/hue differences, one side of the board would have a surface color darker than, for example, Pantone® Cool Gray 5 and the other side would have a color lighter than Pantone® Cool Gray 5. The surface differences can also be described in terms of relative reflectivity, which results in potential temperature differences based on which surface is exposed to the sun.

The objects and advantages of present will be further appreciated in light of the following detailed descriptions and drawings in which:

DETAILED DESCRIPTION OF THE INVENTION

Embodiments of the present invention provide a roofing board, such as an insulation board, particle board, gypsum board and the like, with two exposed surfaces with different colors, one lighter than the other. An embodiment of the present invention is described below with reference to a foam insulation board, but embodiments of the present invention may include any roofing board.

Figure 1:
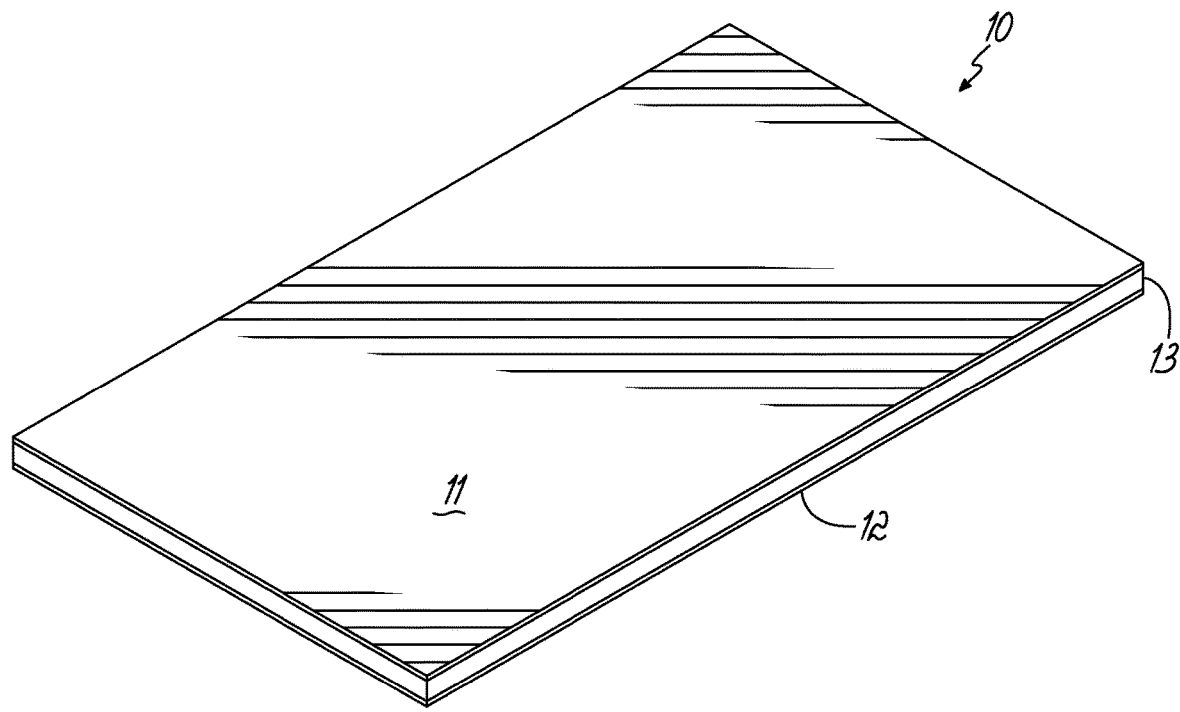
FIG. 1 is a perspective view of an embodiment of the present invention.

As shown in FIG. 1, an insulation board 10 is provided, having a first outer planar surface 11, a second opposed outer planar surface 12, with a foam insulation layer 13 separating the two. Surfaces 11 and 12 are facers, typically used in foam insulation boards. However, facer-less foam boards or other facer-less boards can also be used. The facers can be, for example, Glass Reinforced Felt or Coated Glass Faced. The foam insulation layer 13 can be any foam typically employed for insulation purposes and, in particular, roofing insulation purposes. The foam can be, polyisocyanurate foam, or extruded (XPS) or expanded (EPS) polystyrene. However, embodiments of the present invention are not limited to the particular foam or the particular facing material.

The surfaces 11 and 12 of board 10 have different light absorbing characteristics. The difference in light absorbing characteristics may be expressed in a variety of characteristics including, without limitation, surface color, surface reflectivity, and surface temperature compared to ambient temperature. In one aspect, one surface, for example surface 11, is lighter in color than the other surface, for example surface 12. For example, surface 11 may be lighter than Pantone® Cool Gray 5, whereas surface 12 is darker than Pantone® Cool Gray 5. In another aspect, one surface, for example surface 11, has a higher solar reflectance than the other surface, for example surface 12 (e.g., as determined by ASTM E1918). For example, surface 11 may have a solar reflectance of 45% or greater, whereas surface 12 may have a solar reflectance of 8% or lower. The solar reflectance of the surfaces 11, 12 may be varied based on, for example, the coloring agents used on surfaces 11, 12. For example, coloring agents (e.g. pigments, dyes, etc.) utilized for surface 12 allow the darker facer to absorb the sun's energy, while the coloring agents utilized for surface 11 allow the lighter facer to reflect the sun's energy. In another aspect, when each surface is exposed to the sun, one surface, for example surface 11, may be cooler than the ambient temperature while the other surface, for example surface 12, may be warmer than ambient temperature. For example, surface 11 may be at or below ambient temperature when exposed to the sun. The temperature of surface 11 may be, for example, 5° F. or more below ambient temperature or between 5° F. and 10° F. below ambient temperature. For another example, surface 12 may be above ambient temperature when exposed to the sun. The temperature of surface 12 may be, for example, 30° F. or more above ambient temperature or between 30° F. and 45° F. above ambient temperature. When used in a roofing system, the different light absorbing characteristics of the surfaces 11 and 12 facilitate proper installation of a roof membrane.

Figure 2:
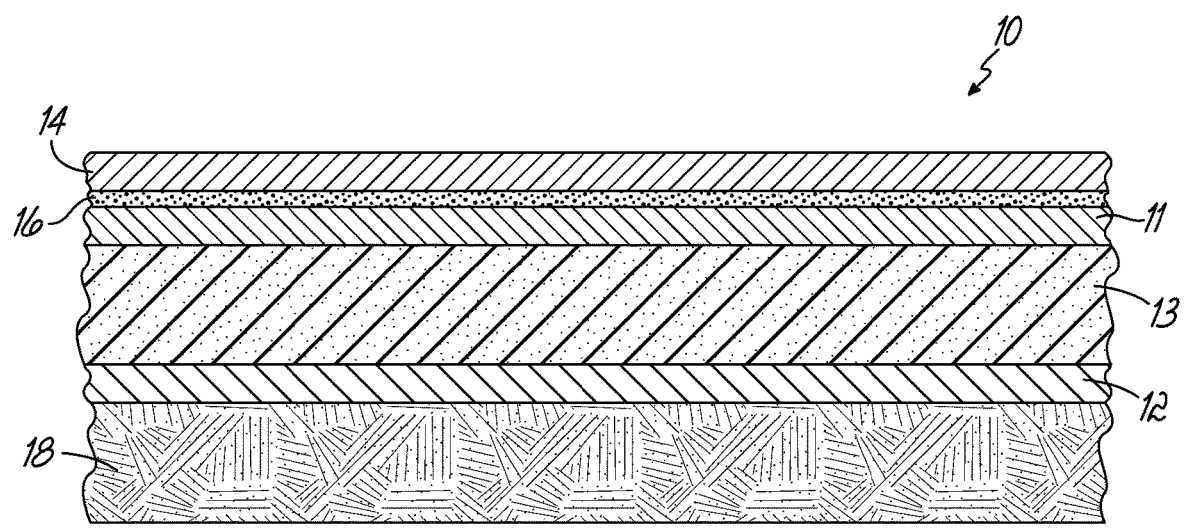
FIG. 2 is a cross-sectional view broken away, showing the insulation board of FIG. 1 covered with a roofing membrane.

As shown in FIG. 2, surface 12 of board 10 is positioned on a roof deck 18. Board 10 can be affixed to the roof deck 18 in a variety of different manners and is typically mechanically fastened or adhered to the roof deck 18. A membrane layer 14 is then adhered to, in this case, surface 11 of board 10 with an adhesive layer 16. The membrane layer 14 can be any membrane typically used for roofing applications. These are typically polymeric membranes and can include, for example, EPDM, PVC, TPO elastomer, as well as many others. Typically, built-up roofs based on hot applied asphaltic material would not be utilized in the present invention. The adhesive layer 16 can be any adhesive typically used to apply the selected membrane to the board 10.

As indicated, surface 11 provides a lighter surface, which does not absorb as much heat as would surface 12, if exposed to the sun. Thus, when a roof is installed in the summer with hotter temperatures, exposing surface 11 upwardly in contact with the adhesive layer 16 will keep the temperature of the adhesive lower, allowing it to cure properly. Because the temperature of the surface 11 may be at or lower than it would be if it were absorbing energy from the sunlight, the time for the adhesive layer 16 to cure is increased compared to a configuration where the surface temperature is significantly above the ambient temperature due to the sunlight. This may provide additional working or "open" time before the membrane layer 14 must be positioned on the adhesive layer 16 in the final position. When adhering membrane layer 14 to surface 11 compared to surface 12, an increase in the "tack-free" time, or the time before adhesive layer 16 becomes tacky, may be 10% or greater, 25% or greater, 40% or greater, between 10% and 55%, or between 25% and 55%.

Alternately, surface 12 could be the upper surface to which the membrane layer 14 is adhered. This surface 12 would be the upper layer when the ambient temperature is lower than desirable for the particular adhesive application where the cure time would be longer than desirable. When the ambient temperature is relatively cold, the time for the adhesive layer 16 to cure when membrane layer 14 is adhered to surface 12 is reduced compared to a configuration where the surface temperature of board 10 is at or below the ambient temperature. In other words, surface 12 will absorb more heat from the sun, raising the outer temperature of board 10 and, again, facilitating adhesion of the membrane layer 14 to the surface 12 with adhesive layer 16. When adhering membrane layer 14 to surface 12 compared to surface 11, a reduction in the "tack-free" time, or the time before adhesive layer 16 becomes tacky, may be 10% or greater, 25% or greater, 40% or greater, between 10% and 55%, or between 25% and 55%.

Thus, embodiments of the present invention allow a roofing installer to choose which surface of the roofing board to expose while installing a roof, thus affecting the temperature of the adhesive and, accordingly, the cure time as the membrane layer 14 is adhered to board 10. The actual increase or decrease in cure time may be dependent on the ambient temperature, UV index, cloud cover, wind speed, and humidity. For example, the decrease in cure time when membrane layer 14 is adhered to surface 12 may be reduced due to significant cloud cover.

Roofing boards according to embodiments of the present invention may be used regardless of whether a membrane is adhered or otherwise mechanically fastened to the roofing board. For example, in an aspect of the present invention, use of the board 10 may decrease the installation time for a thermoplastic polyolefin (TPO) roofing membrane irrespective of the membrane attachment method. In that regard, a TPO membrane is often unrolled on a roof before being adhered or otherwise attached. TPO membranes, which are less supple than other membranes (e.g., EPDM and PVC), require time to unwind and adjust to the shape of the roof. When a TPO membrane is applied to surface 12 of board 10, the increased surface temperature may reduce the shape adjustment time of the TPO membrane. Accordingly, the overall installation time may be reduced.

While specific embodiments have been described in considerable detail to illustrate the present invention, the description is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept:

What is claimed is:

1. A generally reversible planar roofing board for positioning on a roof deck and for receiving a membrane, the membrane able to be adhered to the roofing board using an adhesive, the roofing board comprising:
   a first planar surface including a first composition and a first sun energy absorbing characteristic;
   a second planar surface including the first composition and a second sun energy absorbing characteristic;
   a layer separating the first planar surface from the second planar surface;
   wherein in a first configuration the first planar surface is positionable adjacent the roof deck and the second planar surface is positionable away from the roof deck;
   and wherein in a second configuration the first planar surface is positionable away from the roof deck and the second planar surface is positionable adjacent the roof deck;
   further wherein the second sun energy absorbing characteristic differs from the first sun energy absorbing characteristic.

2. The board claimed in claim 1 wherein said first planar surface is lighter in color than said second planar surface.

3. The board claimed in claim 1 wherein said first planar surface is lighter than Pantone Cool Gray 5 and second planar surface is darker than Pantone Cool Gray 5.

4. The board claimed in claim 1 wherein a first solar reflectance of said first planar surface is greater than a second solar reflectance of said second planar surface.

5. The board claimed in claim 4 wherein the first solar reflectance is greater than or equal to 45% and the second solar reflectance is less than or equal to 8%.

6. The board claimed in claim 1 wherein when exposed to sunlight, a temperature of said first planar surface is at or below an ambient temperature.

7. The board claimed in claim 1 wherein when exposed to sunlight, a temperature of said second planar surface is above an ambient temperature.

8. The board claimed in claim 1 wherein said board is fixed to a roof deck and a roofing membrane is adhered to one of said first and second planar surfaces.

9. The board claimed in claim 8 wherein said roofing membrane is adhered to the first planar surface using an adhesive and a tack-free time of the adhesive is increased by 10% or greater compared to when the roofing membrane is adhered to the second planar surface.

10. The board claimed in claim 8 wherein said roofing membrane is adhered to the second planar surface using an adhesive and a tack-free time of the adhesive is reduced by 10% or greater compared to when the roofing membrane is adhered to the first planar surface.

11. The board claimed in claim 1 wherein said board is a foam insulation board.

12. A method of applying a roof surface, wherein a foam insulation board is fixed to a roof deck; wherein said foam insulation board is a generally planar foam board having a first planar surface and a second planar surface; said first planar surface configured to be affixed to said roof deck and configured to be adhered to a membrane layer, said second planar surface configured to be affixed to said roof deck and configured to be adhered to said membrane layer, wherein light absorption characteristics of said first planar surface are different than light absorption characteristics of said second planar surface, said method comprising:

fixing said foam insulation board to said roof deck with said first planar surface or said second planar surface positioned toward the sun for sun energy to be absorbed by either of said first and second planar surfaces, the foam insulation board being a facer-less board or a board coupled to a first facer defining the first planar surface and a second facer defining the second planar surface, wherein one of said first and second planar surfaces are exposed to an atmosphere, providing an exposed surface; and adhering or attaching a roofing membrane to said exposed surface.

13. The method claimed in claim 12 wherein said first planar surface is lighter in color than said second planar surface.

14. The method claimed in claim 13 wherein said first planar surface is lighter than Pantone Cool Gray 5 and second planar surface is darker than Pantone Cool Gray 5.

15. The method claimed in claim 12 wherein a first solar reflectance of said first planar surface is greater than a second solar reflectance of said second planar surface.

16. The method claimed in claim 15 wherein the first solar reflectance is greater than or equal to 45% and the second solar reflectance is less than or equal to 8%.

17. The method claimed in claim 12 wherein when exposed to sunlight, a temperature of said first planar surface is at or below an ambient temperature.

18. The method claimed in claim 12 wherein when exposed to sunlight, a temperature of said second planar surface is above an ambient temperature.

19. The method claimed in claim 12 wherein the first planar surface is exposed to the atmosphere and a tack-free time of an adhesive used to adhere the membrane is increased by 10% or greater compared to when the second planar surface is exposed to the atmosphere.

20. The method claimed in claim 12 wherein the second planar surface is exposed to the atmosphere and a tack-free time of an adhesive used to adhere the membrane is reduced by 10% or greater compared to when the first planar surface is exposed to the atmosphere.

* * * * *